US010250620B2

(12) United States Patent
Lifliand et al.

(10) Patent No.: US 10,250,620 B2
(45) Date of Patent: *Apr. 2, 2019

(54) SAFE CODE FOR SIGNATURE UPDATES IN AN INTRUSION PREVENTION SYSTEM

(71) Applicant: Microsoft Technology Licensing, LLC, Redmond, WA (US)

(72) Inventors: Vladimir Lifliand, Sammamish, WA (US); Evgeney Ryzhyk, Haifa (IL); Yifat Sagiv, Haifa (IL); Maxim Uritsky, Haifa (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 331 days.

This patent is subject to a terminal disclaimer.

(21) Appl. No.: 15/199,866

(22) Filed: Jun. 30, 2016

(65) Prior Publication Data
US 2016/0315957 A1 Oct. 27, 2016

Related U.S. Application Data

(63) Continuation of application No. 12/146,935, filed on Jun. 26, 2008, now Pat. No. 9,389,839.

(51) Int. Cl.
*G06F 8/41* (2018.01)
*H04L 29/06* (2006.01)

(52) U.S. Cl.
CPC ............ *H04L 63/1416* (2013.01); *G06F 8/41* (2013.01)

(58) Field of Classification Search
CPC ............................... H04L 63/1416; G06F 8/41
USPC ........................................................ 713/176
See application file for complete search history.

(56) References Cited

U.S. PATENT DOCUMENTS

| 5,349,642 A | 9/1994 | Kingdon |
| 5,978,484 A | 11/1999 | Apperson et al. |
| 6,023,509 A | 2/2000 | Herbert et al. |
| 6,363,429 B1 | 3/2002 | Ketcham |
| 6,389,532 B1 | 5/2002 | Gupta et al. |
| 6,487,666 B1 | 11/2002 | Shanklin et al. |
| 6,546,487 B1 | 4/2003 | McManis |
| 6,738,967 B1 | 5/2004 | Radigan |

(Continued)

OTHER PUBLICATIONS

"Optenet Firewall and Protocol Manager", Feb. 27, 2008, 2 Pages.
(Continued)

*Primary Examiner* — Mohammed Waliullah
(74) *Attorney, Agent, or Firm* — Workman Nydegger

(57) ABSTRACT

Described is a technology by which a signature used by network traffic intrusion prevention/detection systems includes logic that helps a prevention/detection engine detect that signature. A signature to detect is compiled into executable logic that is executed to communicate with an engine that evaluates network traffic. The signature logic provides an expression set (such as group of regular expressions) for the engine to match against a token corresponding to the network traffic. When matched, the engine notifies the logic and receives a further expression set to match, or a communication indicative that that the signature was detected. The signature thus directs the analysis, facilitating a lightweight, generic engine. Safety of the signature logic is described as being accomplished through layers, including by publisher signing, and by compilation and execution (e.g., interpretation) in safe environments.

20 Claims, 5 Drawing Sheets

(56) References Cited

U.S. PATENT DOCUMENTS

| | | | |
|---|---|---|---|
| 6,952,822 | B2 | 10/2005 | Shiobara et al. |
| 7,032,216 | B1 | 4/2006 | Nizhegorodov |
| 7,159,240 | B2 | 2/2007 | England et al. |
| 7,512,634 | B2 | 3/2009 | McMillen |
| 7,665,062 | B1 | 2/2010 | Bauer et al. |
| 7,953,984 | B1 | 5/2011 | Chung et al. |
| 2002/0003286 | A1 | 1/2002 | Marty et al. |
| 2003/0004689 | A1 | 1/2003 | Gupta et al. |
| 2003/0061254 | A1 | 3/2003 | Lindwer et al. |
| 2003/0084326 | A1 | 5/2003 | Tarquini |
| 2004/0003286 | A1 | 1/2004 | Kaler et al. |
| 2005/0027987 | A1 | 2/2005 | Neufeld et al. |
| 2005/0076245 | A1 | 4/2005 | Graham et al. |
| 2005/0251570 | A1 | 11/2005 | Heasman et al. |
| 2006/0026573 | A1 | 2/2006 | Smith et al. |
| 2006/0047958 | A1 | 3/2006 | Morais |
| 2006/0075504 | A1 | 4/2006 | Liu |
| 2006/0277539 | A1 | 12/2006 | Amarasinghe et al. |
| 2007/0058540 | A1 | 3/2007 | Kay |
| 2007/0124577 | A1* | 5/2007 | Nielsen ............... H04L 63/0227 713/151 |
| 2008/0137659 | A1 | 6/2008 | Levy-Abegnoli et al. |

OTHER PUBLICATIONS

Final Rejection dated May 24, 2012 for U.S. Appl. No. 12/146,935, Lifliand et al., entitled "Safe Code for Signature Updates in an Intrusion Prevention System," filed Jun. 26, 2008, 28 pages.

Final Rejection dated Aug. 30, 2013 for U.S. Appl. No. 12/146,935, Lifliand et al., entitled "Safe Code for Signature Updates in an Intrusion Prevention System," filed Jun. 26, 2008, 33 pages.

Final Rejection dated Dec. 3, 2014 for U.S. Appl. No. 12/146,935, Lifliand et al., entitled "Safe Code for Signature Updates in an Intrusion Prevention System," filed Jun. 26, 2008, 42 pages.

Non-Final Rejection dated Mar. 3, 2014 for U.S. Appl. No. 12/146,935, Lifliand et al., entitled "Safe Code for Signature Updates in an Intrusion Prevention System," filed Jun. 26, 2008, 37 pages.

Non-Final Rejection dated Dec. 20, 2012 for U.S. Appl. No. 12/146,935, Lifliand et al., entitled "Safe Code for Signature Updates in an Intrusion Prevention System," filed Jun. 26, 2008, 25 pages.

Non-Final Rejection dated Sep. 15, 2011 for U.S. Appl. No. 12/146,935, Lifliand et al., entitled "Safe Code for Signature Updates in an Intrusion Prevention System," filed Jun. 26, 2008, 26 pages.

Non-Final Rejection dated Aug. 14, 2015 for U.S. Appl. No. 12/146,935, Lifliand et al., entitled "Safe Code for Signature Updates in an Intrusion Prevention System," filed Jun. 26, 2008, 29 pages.

Notice of Allowance dated Mar. 28, 2016 for U.S. Appl. No. 12/146,935, Lifliand et al., entitled "Safe Code for Signature Updates in an Intrusion Prevention System," filed Jun. 26, 2008, 4 pages.

Notice of Allowance dated Mar. 14, 2016 for U.S. Appl. No. 12/146,935, Lifliand et al., entitled "Safe Code for Signature Updates in an Intrusion Prevention System," filed Jun. 26, 2008, 13 pages.

Rubin, et al."Mobile Code Security", IEEE Internet Computing, vol. 2, Issue 6, Nov.-Dec. 1998, pp. 30-34.

Sekar, et al."Model-Carrying Code: A Practical Approach for Safe Execution of Untrusted Applications", In Proceedings of the nineteenth ACM symposium on Operating Systems Principles, Oct. 19, 2003,14 Pages.

* cited by examiner

SAFE CODE FOR SIGNATURE UPDATES IN AN INTRUSION PREVENTION SYSTEM

CROSS-REFERENCE TO RELATED APPLICATION

This application is a continuation of, and claims benefit from, commonly assigned, co-pending U.S. patent application Ser. No. 12/146,935, with inventors Vladimir Lifliand et al., filed Jun. 26, 2008, entitled "Safe Code for Signature Updates in an Intrusion Prevention System," which is hereby incorporated by reference herein in its entirety.

BACKGROUND

To protect against malicious content, intrusion prevention systems (and similarly intrusion detection systems) use an engine that includes logic for evaluating incoming (and outgoing) network traffic against signatures to detect patterns of known malicious content. Traditionally, signatures in intrusion prevention systems are described by a set of complex data structures describing how to distinguish legitimate valid data from data corresponding to an attempted attack.

One problem with this approach is based on the signature schema. More particularly, because of the schema, the signature language may not be able to express the state identifying the vulnerability, or can only do so via very complex coding.

Further, to include the logic for various protocols and signature processing, the engine may be a complex, relatively heavyweight mechanism. The engine needs to be maintained, and updated from time to time as new logic to detect new signatures is developed.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which a signature to detect is compiled into executable logic that helps in detecting that signature. The executable logic of the signature is used to direct a network intrusion detection/intrusion prevention engine that evaluates network traffic to look for matches. To this end, the engine communicates with (e.g., calls into) the signature logic to receive an expression set (such as group of regular expressions) from that logic and detects whether a token corresponding to the network traffic matches the expression set. If so, the engine notifies the logic and receives a further expression to match, or a communication indicative that that the signature was detected.

In one aspect, safety of the signature logic is described as being accomplished through layers. For example, in addition to being signed by the publisher, the signature may be authored in a definition language, which is compiled by a safe compiler into source code, which in turn is compiled into intermediate language code. The intermediate language code is executed via an interpreter or a framework (e.g., .NET) that helps protect its surrounding system.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards compiling signatures into code, including the logic that is executed to evaluate traffic for the signatures. Schema-related problems are avoided, while at the same time allowing a lightweight engine to be used to execute the signatures. Because the logic is in the signatures, the engine need not be updated, e.g., as protocols, logic and/or signatures change.

While the various examples herein are directed towards detecting malicious code in an intrusion prevention/intrusion detection system environment, these are only examples. Other uses of parsing data and evaluating that data via logic may benefit from the technology described herein. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing and network traffic analysis in general.

Figure 1:
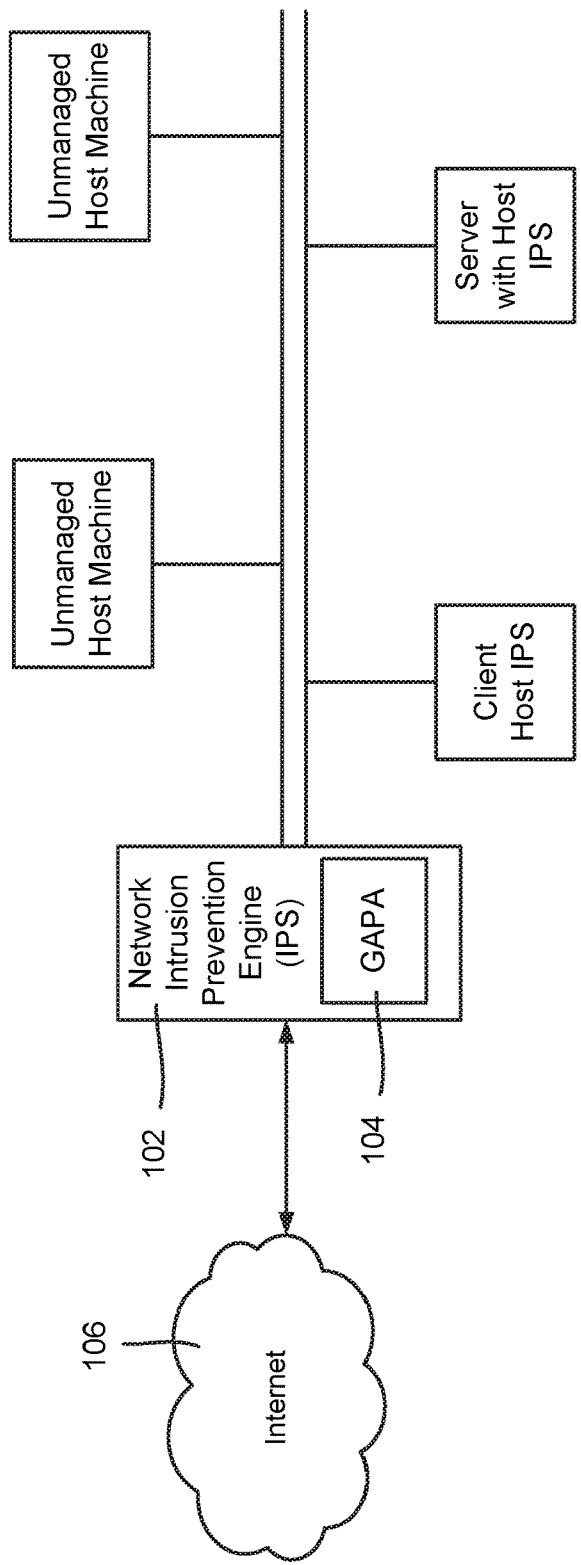
FIG. 1 is a block diagram representing example environment in which a network intrusion prevention system (and/or intrusion detection system) engine, including a generic application-level protocol analyzer, evaluates network traffic.

Turning to FIG. 1, there is shown an intrusion prevention system (including an engine) 102 that is based on a generic application level protocol analyzer (GAPA) 104. Note that as used herein, "intrusion prevention" is equivalent to "intrusion detection" for purposes of brevity in this description. In general, as described in U.S. patent application publication no. 20070112969, (herein incorporated by reference), parsing operations are performed by the generic application level protocol analyzer 104 based on provided data; the analyzer 104 uses the data to detect matching tokens based on network traffic to and/or from the Internet 106. Note that any machine in the network, e.g., server or client, may also host an intrusion prevention system that uses the technology described herein.

By way of example, the analyzer 104 may communicate with some logic to determine that a comma token is to be detected, and when detected, may communicate again to determine that two consecutive slash characters should next be detected, and so on. The logic may be more complex than simply providing a next expression set to match, but in general, the analyzer 104 parses and/or matches data as directed by the logic. Also, the analyzer 104 provides an API for coupled logic to get and set variables, and/or specify that part of the network traffic is to be buffered, e.g., rather than simply having the analyzer discard data (e.g., characters) that are not matches with the expression currently specified by the logic.

Figure 2:
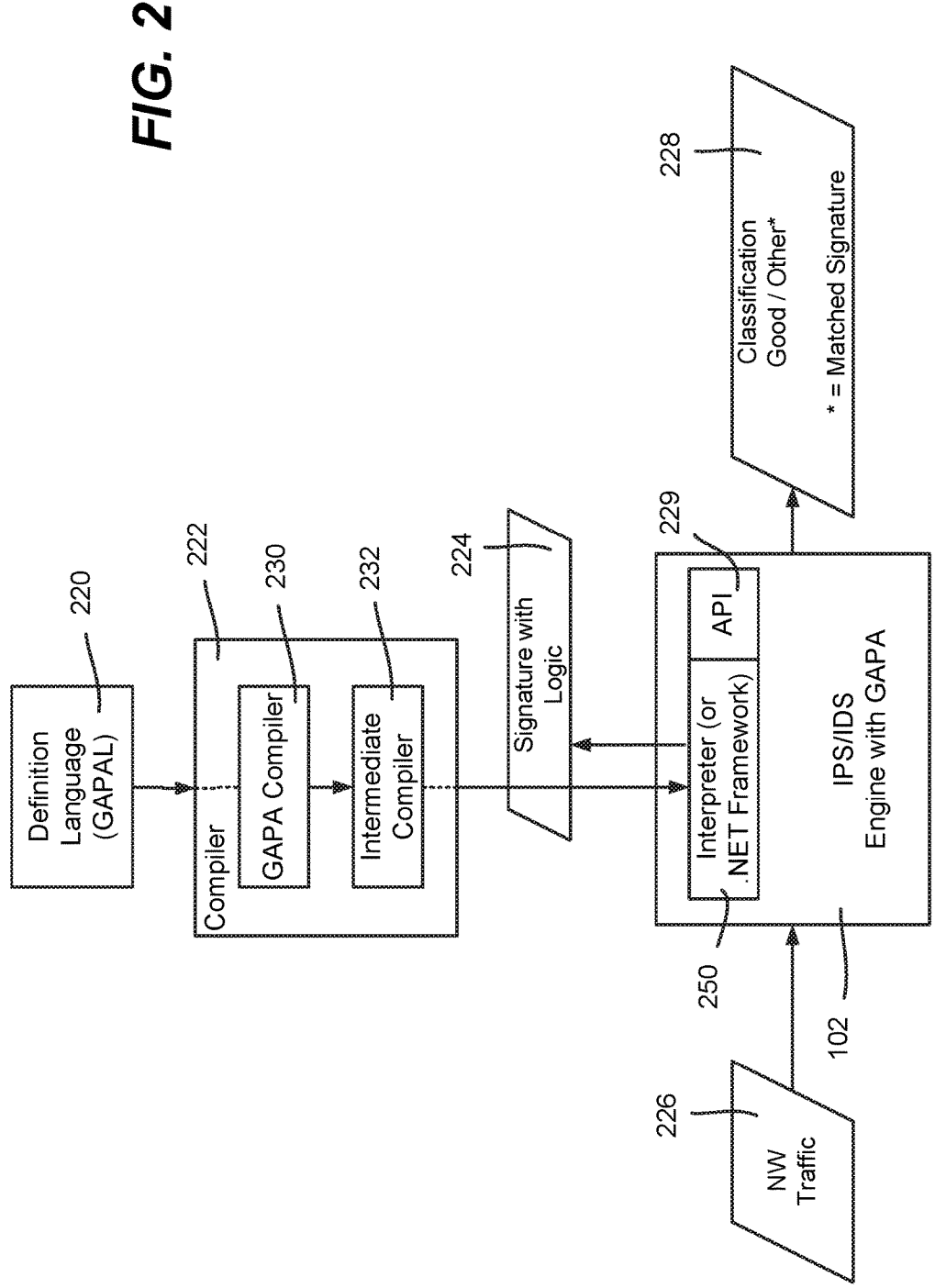
FIG. 2 is a block diagram representing an example network intrusion prevention system based upon a generic application-level protocol analyzer.

FIG. 2 shows how such logic may be developed for a signature, e.g., authored in a definition language 220. A compiler 222 provides signature logic 224 to the analyzer, which in this embodiment is included in the IPS/IDS engine 102, for analyzing network traffic 226, e.g., classifying it as good, or identifying when a signature is matched, including which one. The data block 228 represents this classification. Also shown in FIG. 2 is the API set 229 provided with the engine 102.

In one implementation, the compiler 222 includes a two-level compilation process, namely a GAPA compiler 230 that processes the definition language 220 into a source code in a language such as C++, and a compiler 232 that takes the generated source code and processes it into an intermediate language, such as MSIL (Microsoft® Intermediate Language); note that compilers already exist that produce MSIL code from C++ or C#, such as provided by Microsoft Corporation.

One consideration when dealing with executable code is safety. The delivered machine code must not be able to do harm (either as a result of intentional attack or due to a human mistake) the system. Thus, in one implementation, the safety of the machine code in a signature is guaranteed, to an extent, by requiring that the compiled signature be signed by the publisher's certificate.

While it is a feasible alternative to compile the source code directly into machine code, this is not particularly safe, as the machine code may be able to harm the system, with only the signed certificate as a guarantee of safety, which may help against intentional malicious code, but not erroneous malicious code. It is also a feasible alternative to compile the source code into a proprietary language for a proprietary interpreter, however again this is not particularly transparent with respect to safety, and adds complexity.

Thus, in one implementation, the analyst authoring the source code does not write it for direct compilation. Instead the signature is developed on a safe programming environment, such as using a subset of the C++ language that is verified to use only safe constructions. For example, because Microsoft® C++/CLI or C# compilers exist that produce MSIL code, by transforming GAPA language to managed C++ or C# (restricted to safe constructions only) and using an already existing compiler, to obtain the machine or intermediate code.

Further, because the source code is compiled into an intermediate languages, such as MSIL, the code can be safely executed within an interpreter 250, e.g., contained in the engine 102, or through the .NET Framework. Either approach further ensures that the delivered signature logic 224 (intermediate code) cannot harm the system in which it is running. Moreover, the MSIL opcode set has been proven to be reasonably good and robust.

To summarize, safety is provided in layers in one example implementation; signature is signed by a publisher, and the C++ code is not developed directly, but is generated by a tool that does not use "dangerous" C++ constructions like pointer arithmetic. The compiler may be configured to validate that only safe code is produced. The interpreter or .NET Framework (virtual machine) running MSIL code verifies that only valid operations are executed.

As can be readily appreciated, by being arranged as executable code in the above manner, the signature logic 224 can express virtually any safe logic. At the same time, the IPS/IDS engine 102 is very lightweight and easier to maintain because the logic is in the delivered code rather than built into the engine. This is advantageous, as keeping most of the complex logic in analyst tools rather than in the IPS/IDS engine reduces the cost of software maintenance. Further, as can be readily appreciated, in this model there are no abstraction layers and/or adapters, providing good performance.

As a result, the IPS engine 102 comprises a mostly generic component shipped to the end user as a product that rarely needs changing. By providing the logic as part of the signature in this model, the IPS engine 102 is developed in advance to be flexible to handle future attacks yet to be discovered.

Turning to aspects of operation, each signature implements a state machine (e.g., a push down automata implementing an LL(1) parser). The engine 102, via the analyzer 104, is responsible for tokenizing the input according to regular expressions specified inside the signature logic 224, and letting the state machine code carried with the signature track the state of the protocol, firing a "signature match" event upon a specific condition being matched.

Figure 3:
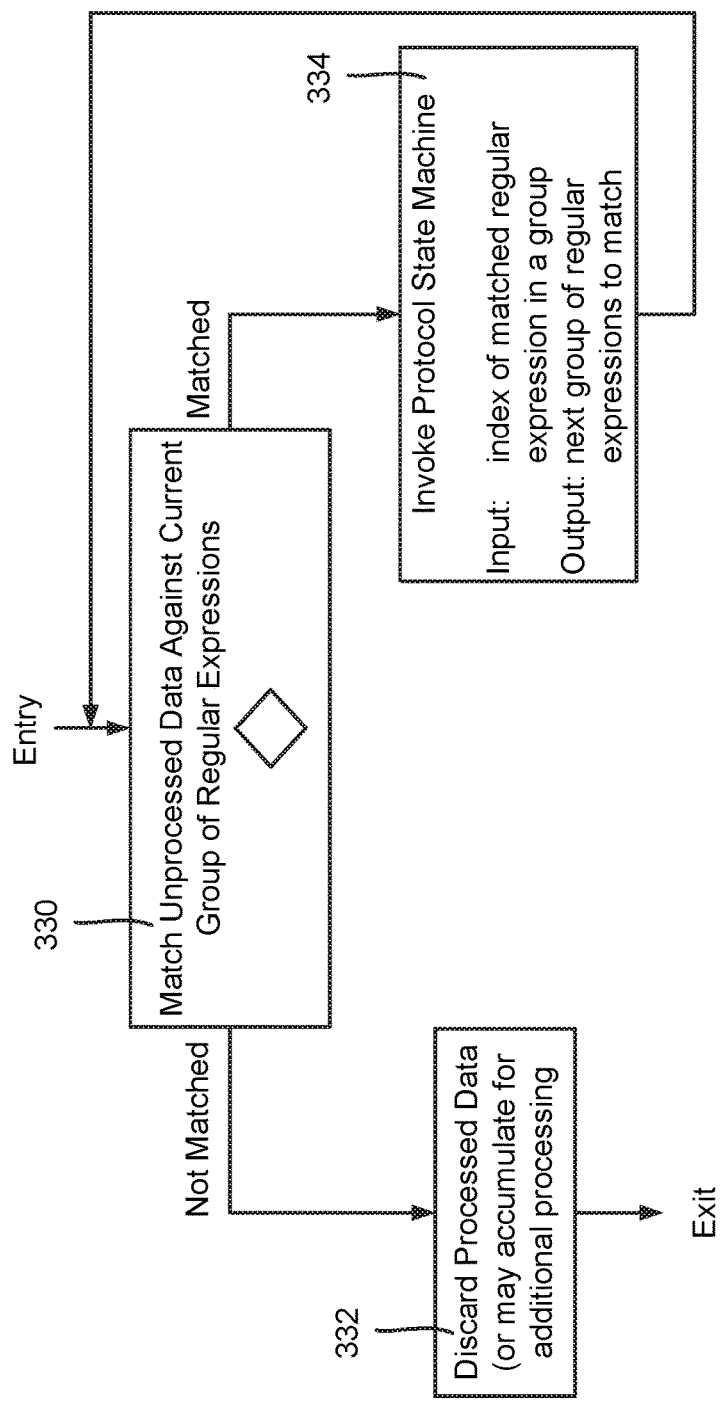
FIG. 3 is a representation of operation of a generic application-level protocol analyzer to match data in network traffic.

This is generally represented in FIG. 3, where the engine attempts to match (block 330) each network packet token (entry) against a current group of one or more regular expressions. If not found, the input data is discarded (block 332), although it may be buffered for possible use by the logic as desired, as described herein, e.g., if the logic has called a "Lock Buffer" API provided by the engine. When a token is matched (block 334), the engine requests the next group of expressions to match, and so on.

As can be readily appreciated, coding the signature ensures that the GAPA-based engine need not be aware of the actual algorithms involved in matching signatures to the network traffic. The overall operation is very generic, leaving the specific details of how parsing for a signature is done to the signature itself, which is easily updated by delivering a new set of signatures. This operation is very lightweight and completely transparent to the end-user.

It is typical that providing a more generic evaluation engine decreases performance. However, moving the pieces of code that are not expected to change to the engine for processing as native code instead of as interpreted code will improve performance.

Figure 4:
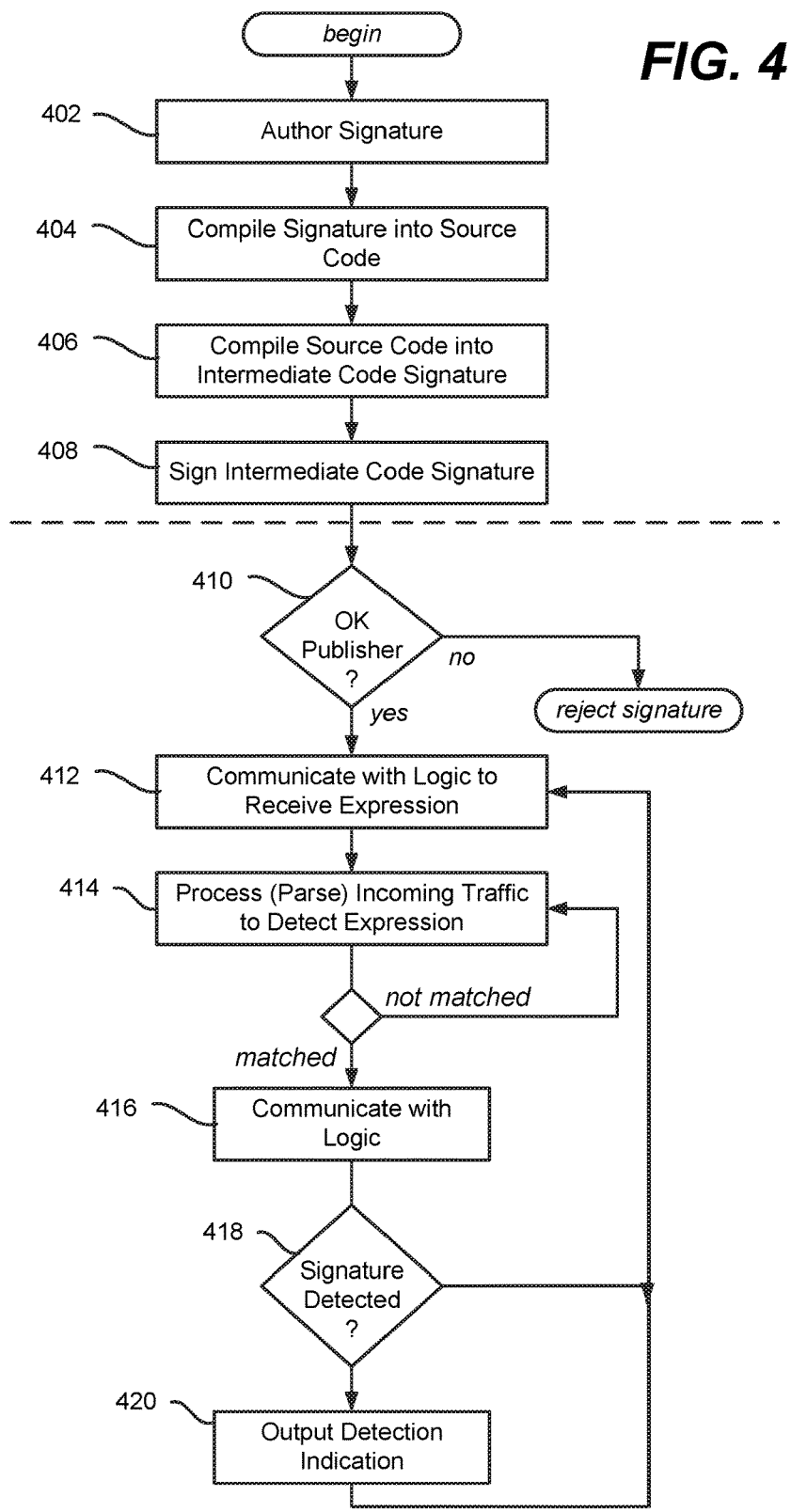
FIG. 4 is a flow diagram representing example steps taken to provide and use a network intrusion prevention system based upon a generic application-level protocol analyzer.

FIG. 4 summarizes some of the example operations, beginning at step 402 which represents authoring the signature as executable logic. Step 404 represents the first-level compilation into source code, followed by step 406 which represents the second-level compilation into intermediate code. Step 408 represents signing the intermediate code. The dashed line in FIG. 4 is a representation that differentiates the preparation stage versus the usage stage of the executable signature.

Step 410 represents verifying the publisher, which in addition to the compilation steps provides layered security. If the publisher is OK, step 412 represents the engine's communication with the logic to receive an expression to evaluate as possibly being part of a signature. The processing/parsing continues until the expression is matched.

When matched, further communication with the logic is performed, generally to obtain the next expression to match, or to determine (step 418) whether the signature was fully detected, and if so, to output an indication (step 420), such as to an application. In general, the evaluation engine continues to communicate with the executable signature to obtain an expression to match for signature evaluation.

Exemplary Operating Environment

Figure 5:
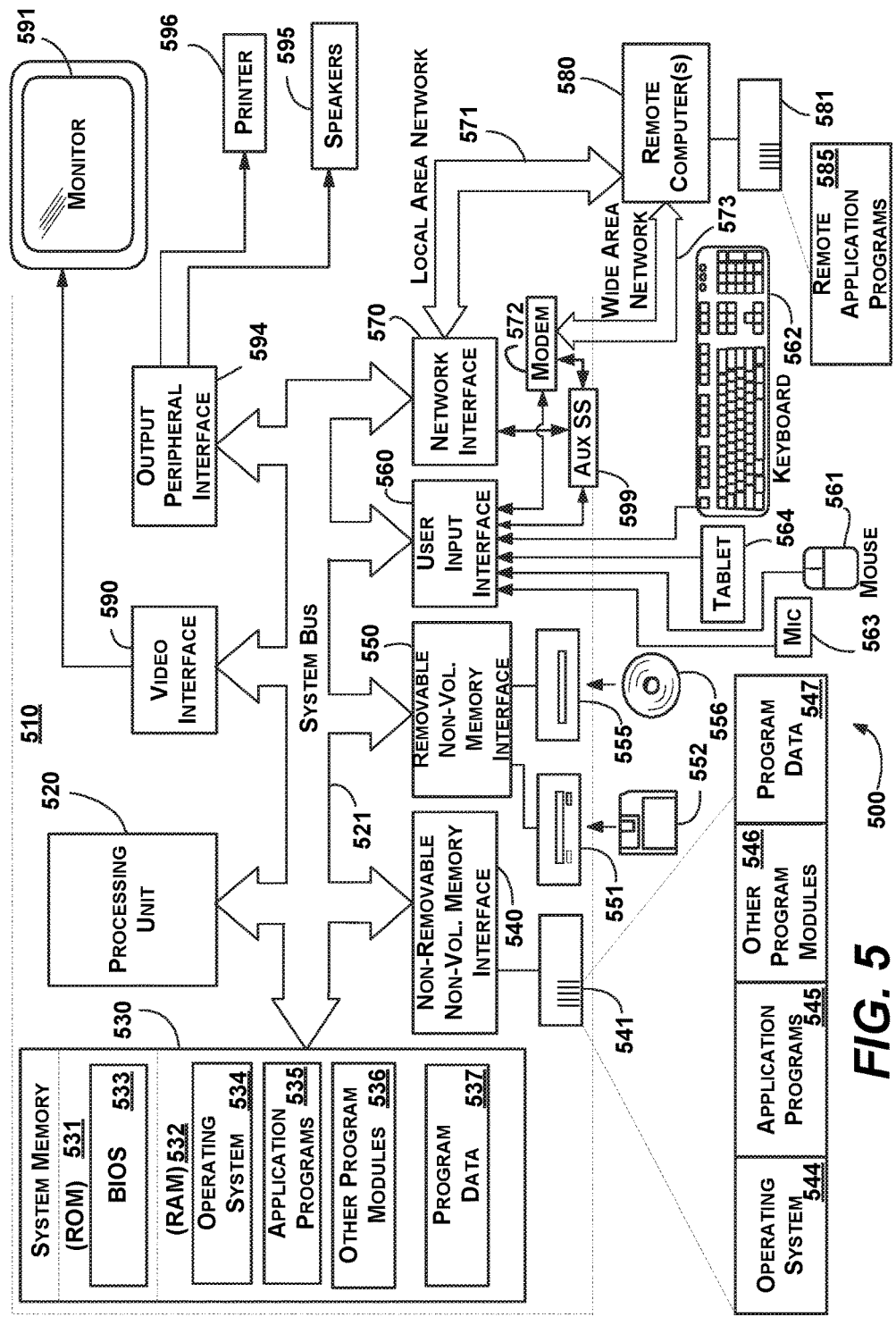
FIG. 5 shows an illustrative example of a computing environment into which various aspects of the present invention may be incorporated.

FIG. 5 illustrates an example of a suitable computing and networking environment 500 on which the examples of FIGS. 1-4 may be implemented. The computing system environment 500 is only one example of a suitable computing environment and is not intended to suggest any limitation as to the scope of use or functionality of the invention. Neither should the computing environment 500 be interpreted as having any dependency or requirement relating to any one or combination of components illustrated in the exemplary operating environment 500.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, embedded systems, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 5, an exemplary system for implementing various aspects of the invention may include a general purpose computing device in the form of a computer 510. Components of the computer 510 may include, but are not limited to, a processing unit 520, a system memory 530, and a system bus 521 that couples various system components including the system memory to the processing unit 520. The system bus 521 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 510 typically includes a variety of computer-readable media. Computer-readable media can be any available media that can be accessed by the computer 510 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 510. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media.

The system memory 530 includes computer storage media in the form of volatile and/or nonvolatile memory such as read only memory (ROM) 531 and random access memory (RAM) 532. A basic input/output system 533 (BIOS), containing the basic routines that help to transfer information between elements within computer 510, such as during start-up, is typically stored in ROM 531. RAM 532 typically contains data and/or program modules that are immediately accessible to and/or presently being operated on by processing unit 520. By way of example, and not limitation, FIG. 5 illustrates operating system 534, application programs 535, other program modules 536 and program data 537.

The computer 510 may also include other removable/non-removable, volatile/nonvolatile computer storage media. By way of example only, FIG. 5 illustrates a hard disk drive 541 that reads from or writes to non-removable, nonvolatile magnetic media, a magnetic disk drive 551 that reads from or writes to a removable, nonvolatile magnetic disk 552, and an optical disk drive 555 that reads from or writes to a removable, nonvolatile optical disk 556 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 541 is typically connected to the system bus 521 through a non-removable memory interface such as interface 540, and magnetic disk drive 551 and optical disk drive 555 are typically connected to the system bus 521 by a removable memory interface, such as interface 550.

The drives and their associated computer storage media, described above and illustrated in FIG. 5, provide storage of computer-readable instructions, data structures, program modules and other data for the computer 510. In FIG. 5, for example, hard disk drive 541 is illustrated as storing operating system 544, application programs 545, other program modules 546 and program data 547. Note that these components can either be the same as or different from operating system 534, application programs 535, other program modules 536, and program data 537. Operating system 544, application programs 545, other program modules 546, and program data 547 are given different numbers herein to illustrate that, at a minimum, they are different copies. A user may enter commands and information into the computer 510 through input devices such as a tablet, or electronic digitizer, 564, a microphone 563, a keyboard 562 and pointing device 561, commonly referred to as mouse, trackball or touch pad.

Other input devices not shown in FIG. 5 may include a joystick, game pad, satellite dish, scanner, or the like. These and other input devices are often connected to the processing unit 520 through a user input interface 560 that is coupled to the system bus, but may be connected by other interface and bus structures, such as a parallel port, game port or a universal serial bus (USB). A monitor 591 or other type of display device is also connected to the system bus 521 via an interface, such as a video interface 590. The monitor 591 may also be integrated with a touch-screen panel or the like. Note that the monitor and/or touch screen panel can be physically coupled to a housing in which the computing device 510 is incorporated, such as in a tablet-type personal computer. In addition, computers such as the computing device 510 may also include other peripheral output devices such as speakers 595 and printer 595, which may be connected through an output peripheral interface 594 or the like.

The computer 510 may operate in a networked environment using logical connections to one or more remote computers, such as a remote computer 580. The remote computer 580 may be a personal computer, a server, a router, a network PC, a peer device or other common network node, and typically includes many or all of the elements described above relative to the computer 510, although only a memory storage device 581 has been illustrated in FIG. 5. The logical connections depicted in FIG. 5 include one or more local area networks (LAN) 571 and one or more wide area networks (WAN) 573, but may also include other networks. Such networking environments are commonplace in offices, enterprise-wide computer networks, intranets and the Internet.

When used in a LAN networking environment, the computer 510 is connected to the LAN 571 through a network interface or adapter 570. When used in a WAN networking environment, the computer 510 typically includes a modem 572 or other means for establishing communications over the WAN 573, such as the Internet. The modem 572, which may be internal or external, may be connected to the system bus 521 via the user input interface 560 or other appropriate mechanism. A wireless networking component such as comprising an interface and antenna may be coupled through a suitable device such as an access point or peer computer to a WAN or LAN. In a networked environment, program modules depicted relative to the computer 510, or portions thereof, may be stored in the remote memory storage device. By way of example, and not limitation, FIG. 5 illustrates remote application programs 585 as residing on memory device 581. It may be appreciated that the network connections shown are exemplary and other means of establishing a communications link between the computers may be used.

An auxiliary subsystem 599 (e.g., for auxiliary display of content) may be connected via the user interface 560 to allow data such as program content, system status and event notifications to be provided to the user, even if the main portions of the computer system are in a low power state. The auxiliary subsystem 599 may be connected to the modem 572 and/or network interface 570 to allow communication between these systems while the main processing unit 520 is in a low power state.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment, a method comprising:
obtaining, by an engine, a signature including executable logic that is executed to evaluate network traffic for detecting the signature and a state machine for tracking a state of a protocol defined by the executable logic of the signature;
determining that the executable logic of the signature is signed by a publisher;
generating tokens by parsing the network traffic according to one or more expressions obtained from the executable logic;
sending the generated tokens to the state machine of the signature;
allowing the state machine of the signature to use the generated tokens to track the state of the protocol as the network traffic is processed by the engine; and
receiving a detected pattern of content from the state machine based on the tokens used by the state machine.

2. The method of claim 1, further comprising:
obtaining the one or more expressions from the executable logic.

3. The method of claim 1, wherein obtaining the signature includes:
obtaining the one or more expressions from the signature, wherein obtaining the one or more expressions further comprises providing the one or more expressions to evaluate, received from the executable logic, to a protocol analyzer associated with the engine.

4. The method of claim 3, further comprising:
responsive to receiving the detected pattern of content from the state machine based on the used tokens, providing a next group of one or more expressions to evaluate received from the executable logic to the protocol analyzer.

5. The method of claim 1, further comprising:
outputting an indication when the signature has been detected.

6. In a computing environment, a system comprising:
at least one hardware device processor;
a network traffic evaluation engine configured to evaluate network traffic to determine if a signature is matched, the network traffic evaluation engine executing logic to:
obtain the signature to match, the signature comprising executable logic that is executed to evaluate the network traffic and a state machine for tracking a state of a protocol defined by the executable logic of the signature;
a generic protocol analyzer configured to receive an expression set from the executable logic from the network traffic evaluation engine and execute logic to:
generate one or more tokens by parsing the network traffic according to the received expression set to detect whether the expression set is matched; and
send the generated tokens to the state machine of the signature via the network traffic evaluation engine to allow the state machine to use the generated tokens to track the state of the protocol;
the network traffic evaluation engine further configured to execute logic to:
obtain a detected pattern of content from the state machine based on the tokens used by the state machine; and
obtain a next expression set to tokenize.

7. The system of claim 6, further comprising:
a compiler configured to produce the executable logic corresponding to the signature.

8. The system of claim 7, wherein the compiler is further configured to produce source code from a signature definition language.

9. The system of claim 7, wherein the compiler includes a first level that is configured to provide source code from a signature definition language, and a second level that is configured to provide intermediate language or machine code from the source code.

10. The system of claim 6, wherein the generic protocol analyzer is further configured to execute logic to:
output an indication that the signature is detected.

11. The system of claim 6, wherein the network traffic evaluation engine includes an application programming interface (API) set by which the executable logic sets or gets, or both sets and gets, at least one variable maintained by the evaluation engine.

12. The system of claim 6, wherein the network traffic evaluation engine includes an API set by which the executable logic controls execution of the network traffic evaluation engine.

13. A system comprising:
at least one hardware device processor;
at least one computer storage memory storing computer-executable instructions that, when executed, cause one or more of the at least one hardware device processor to:
receive a signature that includes executable logic that is executed to evaluate network traffic for detecting the signature in the network traffic and a state machine for tracking a state of a protocol defined by the executable logic of the signature;
determine that the executable logic included in the signature is signed by a publisher;
generate one or more tokens by parsing the network traffic according to a first expression set received from the executable logic;
send the generated tokens to the state machine of the signature to track the state of the protocol using the generated tokens;
detect whether the generated tokens corresponding to the network traffic match the first expression set received from the executable logic; and
responsive to a detection that the generated tokens corresponding to the network traffic match the first expression set, notify the executable logic and receive a second expression set to match or a communication indicating that the signature is detected.

14. The system of claim 13, wherein:
the executable logic of the signature is described in a definition language, wherein
the definition language is compiled into source code, and the source code is compiled into intermediate code.

15. The system of claim 14, wherein:
communicating with the executable logic comprises interpreting the intermediate code.

16. The system of claim 13, wherein the computer-executable instructions, when executed, cause one or more of the at least one hardware device processor to:
receive a function call to set a variable,
receive a function call to get a variable, and
receive a function call to buffer data.

17. The system of claim 13, wherein the computer-executable instructions, when executed, cause one or more of the at least one hardware device processor to:
provide the first expression set received from the executable logic to a protocol analyzer for evaluation;
process the network traffic to determine a match between each network packet token and the first expression set; and
responsive to a determination that the each network packet token does not match, discard the each network packet token.

18. The system of claim 13, wherein the computer-executable instructions, when executed, cause one or more of the at least one hardware device processor to:
provide the first expression set received from the executable logic to a protocol analyzer for evaluation;
process the network traffic to determine a match between each network packet token and the first expression set; and
responsive to a determination that the each network packet token does not match, buffer one or more of the each network packet token.

19. The system of claim 13, wherein the computer-executable instructions, when executed, cause one or more of the at least one hardware device processor to:
initiate a compilation of the signature into safe source code.

20. The system of claim 13, wherein the computer-executable instructions, when executed, cause one or more of the at least one hardware device processor to:
output an indication when the signature has been detected.

* * * * *